United States Patent
Cheong et al.

(10) Patent No.: US 11,582,815 B2
(45) Date of Patent: Feb. 14, 2023

(54) ELECTRONIC DEVICE FOR RECEIVING DATA PACKET IN BLUETOOTH NETWORK ENVIRONMENT AND METHOD THEREOF

(71) Applicant: Samsung Electronics Co., Ltd., Suwon-si (KR)

(72) Inventors: Gupil Cheong, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 318 days.

(21) Appl. No.: 16/933,301

(22) Filed: Jul. 20, 2020

(65) Prior Publication Data
US 2021/0076435 A1  Mar. 11, 2021

(30) Foreign Application Priority Data
Sep. 11, 2019 (KR) .................. 10-2019-0112778

(51) Int. Cl.
*H04L 29/06* (2006.01)
*H04W 76/14* (2018.01)
(Continued)

(52) U.S. Cl.
CPC ............ *H04W 76/14* (2018.02); *H04B 1/713* (2013.01); *H04L 9/0861* (2013.01); *H04L 9/12* (2013.01);
(Continued)

(58) Field of Classification Search
CPC ... H04W 76/14; H04W 12/03; H04W 12/041; H04W 56/0015; H04W 68/00;
(Continued)

(56) References Cited

U.S. PATENT DOCUMENTS 4,187,392 A * 2/1980 Safford ...................... H04L 9/12
380/47
6,631,271 B1 * 10/2003 Logan .................. H04L 67/306
455/457
(Continued)

FOREIGN PATENT DOCUMENTS

KR  10-2011-0064528 A   6/2011
WO  WO-0225838 A1 * 3/2002 ............ H04W 48/16
(Continued)

OTHER PUBLICATIONS

International Search Report dated Oct. 30, 2020, issued in an International Application No. PCT/KR2020/009504.
(Continued)

*Primary Examiner* — John B King
(74) *Attorney, Agent, or Firm* — Jefferson IP Law, LLP

(57) ABSTRACT

An electronic device for receiving data packets in a Bluetooth environment is provided. The electronic device includes a wireless communication circuitry configured to support a Bluetooth protocol. The wireless communication circuitry is configured to establish a first link with a first external electronic device, synchronize a secret key generation scheme with the first external electronic device based on information obtained while establishing the first link, receive page information transmitted from a second external electronic device, based on Bluetooth address information of the first external electronic device, the Bluetooth address information being obtained while establishing the first link, generate a link key used for a second link between the first external electronic device and the second external electronic device, based on the synchronized secret key generation scheme, and receive an encrypted data packet transmitted over the second link from the second external electronic device using the generated link key.

20 Claims, 12 Drawing Sheets

(51) Int. Cl.
*H04W 56/00* (2009.01)
*H04W 68/00* (2009.01)
*H04B 1/713* (2011.01)
*H04L 9/08* (2006.01)
*H04L 9/40* (2022.01)
*H04L 9/12* (2006.01)
*H04W 12/03* (2021.01)
*H04W 12/041* (2021.01)
*H04W 76/19* (2018.01)

(52) U.S. Cl.
CPC ............. *H04L 63/18* (2013.01); *H04W 12/03* (2021.01); *H04W 12/041* (2021.01); *H04W 56/0015* (2013.01); *H04W 68/00* (2013.01); *H04W 76/19* (2018.02)

(58) Field of Classification Search
CPC ..... H04W 76/19; H04W 4/80; H04W 12/033; H04W 12/0471; H04W 76/15; H04W 12/50; H04W 8/005; H04W 84/18; H04W 56/001; H04W 88/02; H04B 1/713; H04L 9/0861; H04L 9/12; H04L 63/18; H04L 9/0838; H04L 9/0841; H04L 9/14; H04L 9/3215; H04L 2209/80; H04L 2209/805
See application file for complete search history.

(56) References Cited

U.S. PATENT DOCUMENTS

| | | | |
|---|---|---|---|
| 9,100,828 B2 | 8/2015 | Dave et al. | |
| 9,480,096 B1 | 10/2016 | Lee et al. | |
| 9,924,010 B2 | 3/2018 | Watson et al. | |
| 10,299,300 B1 | 5/2019 | Young | |
| 2001/0019956 A1* | 9/2001 | Tada ................. | H04W 52/0232 455/515 |
| 2002/0064134 A1* | 5/2002 | Lee ...................... | H04W 36/16 370/252 |
| 2002/0090968 A1* | 7/2002 | Lee ................... | H04W 72/1247 455/527 |
| 2002/0120750 A1* | 8/2002 | Nidd ...................... | H04L 67/51 709/227 |
| 2003/0003912 A1* | 1/2003 | Melpignano ...... | H04W 36/0055 455/436 |
| 2004/0203366 A1* | 10/2004 | Chen .................... | H04W 76/10 455/41.2 |
| 2004/0203389 A1* | 10/2004 | Kojima ................. | H04W 88/02 455/449 |
| 2007/0297440 A1* | 12/2007 | Moon ..................... | H04W 8/26 370/458 |
| 2008/0057990 A1* | 3/2008 | Fuccello ............... | H04W 76/10 455/507 |
| 2009/0046763 A1* | 2/2009 | Kerai ..................... | H04B 1/713 375/136 |
| 2009/0061769 A1* | 3/2009 | Zimbric ............ | H04M 1/72412 455/41.2 |
| 2009/0180519 A1* | 7/2009 | Lee ........................ | H04B 1/713 375/E1.001 |
| 2010/0130131 A1* | 5/2010 | Ha ..................... | H04M 1/72412 455/41.3 |
| 2011/0063103 A1* | 3/2011 | Lee ....................... | H04W 8/005 340/505 |
| 2011/0077056 A1* | 3/2011 | Park .................... | H04W 52/0254 455/569.1 |
| 2011/0126014 A1* | 5/2011 | Camp, Jr. ............. | H04W 12/50 713/168 |
| 2011/0136434 A1 | 6/2011 | Choi | |
| 2012/0190302 A1* | 7/2012 | Reunamaki .......... | H04W 8/005 455/41.2 |
| 2012/0289159 A1* | 11/2012 | Palin .................... | H04W 48/14 455/41.2 |
| 2014/0147122 A1* | 5/2014 | Ahmed ................ | H04W 12/04 398/106 |
| 2014/0273845 A1 | 9/2014 | Russell et al. | |
| 2016/0056884 A1 | 2/2016 | Dave et al. | |
| 2016/0098244 A1* | 4/2016 | Hsieh ..................... | G06F 3/165 700/94 |
| 2016/0112825 A1 | 4/2016 | Miller | |
| 2016/0157078 A1 | 6/2016 | Palin et al. | |
| 2016/0241523 A1* | 8/2016 | Ahn .................. | H04L 63/0428 |
| 2018/0205813 A1 | 7/2018 | Watson et al. | |
| 2019/0174557 A1 | 6/2019 | Ueda et al. | |
| 2020/0298925 A1* | 9/2020 | Viner ........................ | B62L 3/00 |
| 2021/0006401 A1* | 1/2021 | Valecha .................. | H04L 63/06 |

FOREIGN PATENT DOCUMENTS

| | | | | |
|---|---|---|---|---|
| WO | WO-2008067388 A1 * | 6/2008 | ............ | H04L 47/10 |
| WO | 2017/035062 A1 | 3/2017 | | |

OTHER PUBLICATIONS

Extended European Search Report dated Jul. 25, 2022, issued in European Patent Application No. 20863514.4.

* cited by examiner

ELECTRONIC DEVICE FOR RECEIVING DATA PACKET IN BLUETOOTH NETWORK ENVIRONMENT AND METHOD THEREOF

CROSS-REFERENCE TO RELATED APPLICATION(S)

This application is based on and claims priority under 35 U.S.C. § 119 of a Korean patent application number 10-2019-0112778, filed on Sep. 11, 2019, in the Korean Intellectual Property Office, the disclosure of which is incorporated by reference herein its entirety.

BACKGROUND

1. Field

The disclosure relates to technologies for receiving data packets. More particularly, the disclosure relates to technologies for receiving data packets in a Bluetooth (BT) network environment.

2. Description of Related Art

The Bluetooth standard technology defined by the Bluetooth special interest group (SIG) defines a protocol for short-range wireless communication between electronic devices. In a Bluetooth network environment, electronic devices may transmit or receive data packets, including content such as texts, voices, images, or videos, in a specified frequency band (e.g., about 2.4 gigahertz (GHz)).

For example, user equipment (UE), such as a smartphone, a tablet, a desktop computer, or a laptop computer, may transmit data packets to another UE or an accessory device. The accessory device may include at least one of, for example, an earphone, a headset, a smart watch, a speaker, a mouse, a keyboard, or a display device.

The above information is presented as background information only to assist with an understanding of the disclosure. No determination has been made, and no assertion is made, as to whether any of the above might be applicable as prior art with regard to the disclosure.

SUMMARY

A topology indicating a Bluetooth network environment may include one user device (e.g., a device under test (DUT)) for transmitting a data packet and a plurality of devices for receiving a data packet from the user device. For example, when earphones (or a headset) are connected to a smartphone, the earphone worn on the left ear of a user and the earphone worn on the right ear of the user may receive data packets from the smartphone.

Unless the plurality of devices (e.g., earphones) which receive data packets are connected to each other in a wired manner, each of the plurality of devices which receive the data packets may establish a separate link with the user device. In this case, because the user device should create a plurality of links to transmit data packets, resources and power consumed by the user device may be increased, thus increasing complexity.

Aspects of the disclosure are to address at least the above-mentioned problems and/or disadvantages and to provide at least the advantages described below. Accordingly, an aspect of the disclosure is to provide an electronic device for receiving a data packet in a Bluetooth network environment and a method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuitry configured to support a Bluetooth protocol. The wireless communication circuitry may be configured to establish a first link with a first external electronic device, synchronize a secret key generation scheme with the first external electronic device based on information obtained while establishing the first link, receive page information transmitted from a second external electronic device, based on Bluetooth address information of the first external electronic device, the Bluetooth address information being obtained while establishing the first link, generate a link key used for a second link between the first external electronic device and the second external electronic device, based on the synchronized secret key generation scheme, and receive an encrypted data packet transmitted over the second link from the second external electronic device using the generated link key.

In accordance with another aspect of the disclosure, an electronic device is provided. The electronic device includes a wireless communication circuitry configured to support a Bluetooth protocol. The wireless communication circuitry may be configured to establish a first link with a first external electronic device, synchronize a secret key generation scheme with the first external electronic device based on information obtained while establishing the first link, perform a page scan based on Bluetooth address information of the electronic device, receive a signal for requesting to establish a second link from a second external electronic device, and pair with the second external electronic device based on the synchronized secret key generation scheme.

In accordance with another aspect of the disclosure, an electronic device is provided. The electronic device includes a wireless communication circuitry configured to support a Bluetooth protocol, and a memory, operatively connected with the wireless communication circuitry, for storing a secret key generation scheme synchronized between the electronic device and a first external electronic device. The wireless communication circuitry may be configured to establish a first link with the first external electronic device, receive page information transmitted from a second external electronic device, based on Bluetooth address information of the first external electronic device, the Bluetooth address information being obtained while establishing the first link or being previously stored in the memory, generate a link key used for a second link between the first external electronic device and the second external electronic device, based on the stored secret key generation scheme, and receive an encrypted data packet transmitted over the second link from the second external electronic device using the generated link key.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
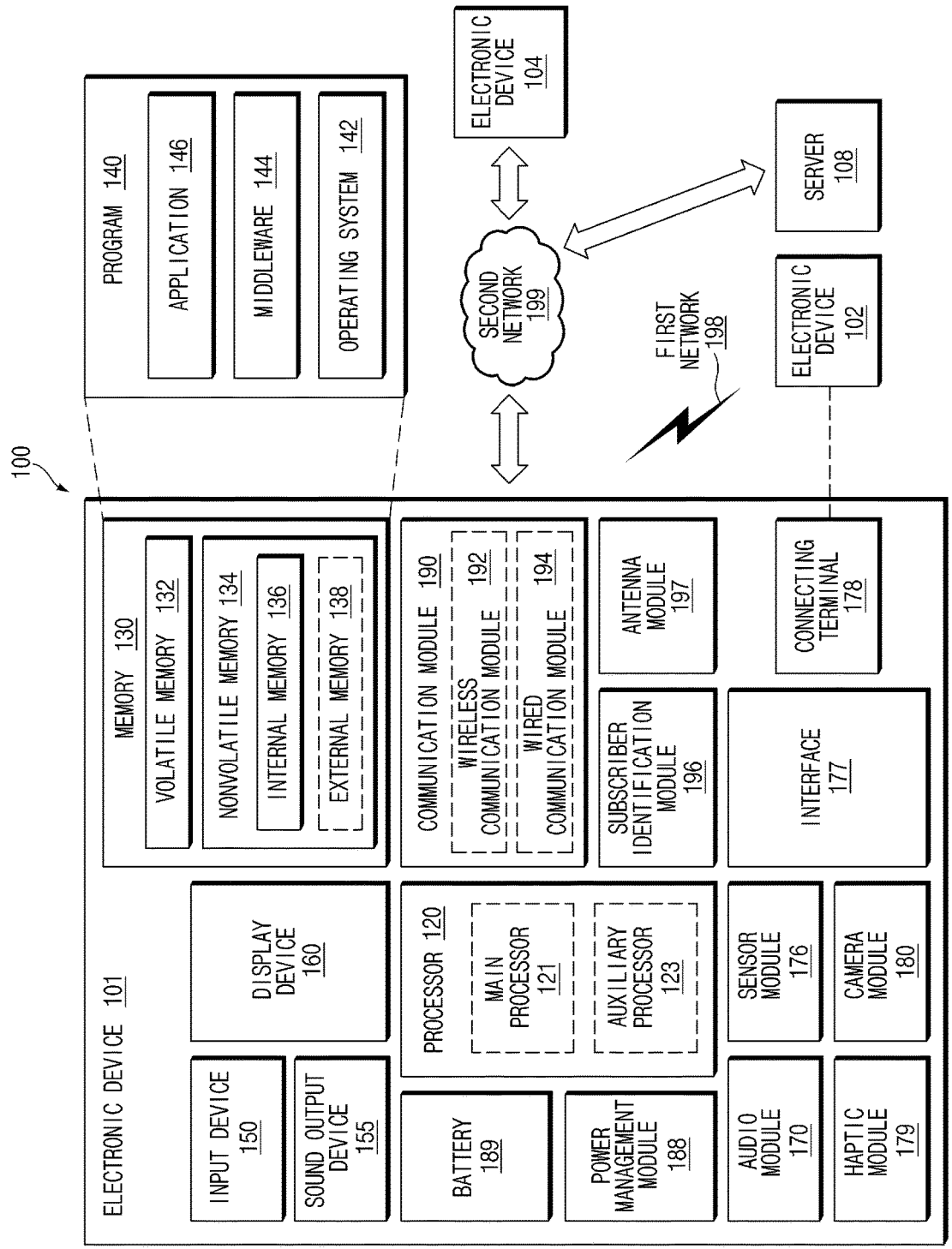
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
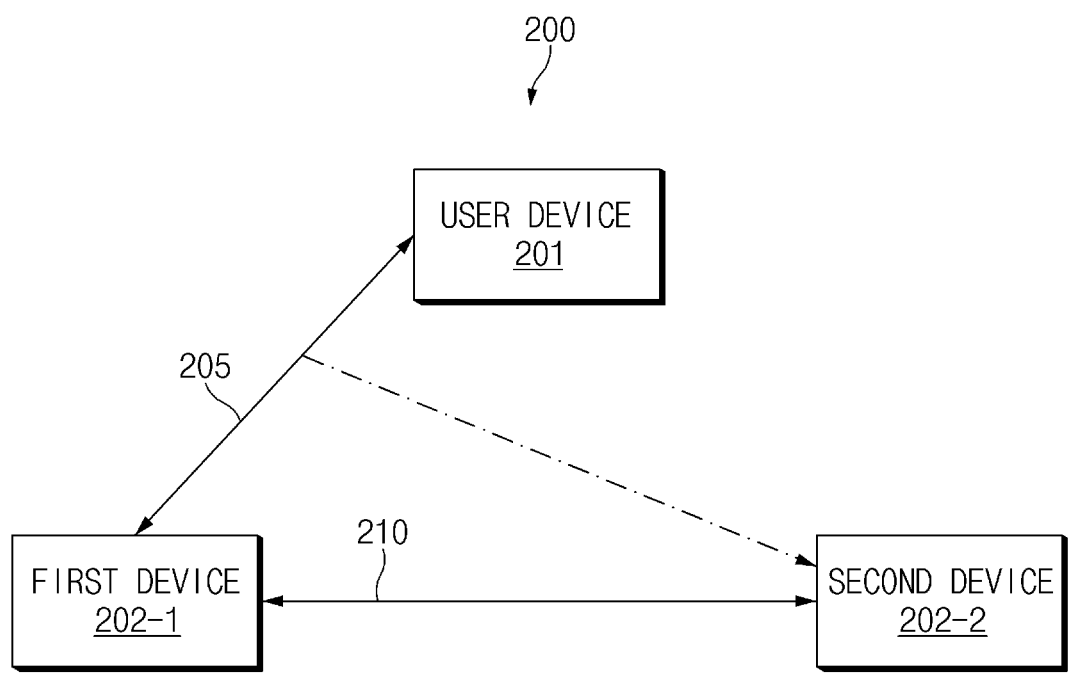
FIG. 2 illustrates a topology indicating a Bluetooth network environment according to an embodiment of the disclosure.

FIG. 2 illustrates a topology 200 indicating a Bluetooth network environment according to an embodiment of the disclosure. A definition of a specific term among contents described below may be based on the Bluetooth core specification document of the Bluetooth SIG.

Referring to FIG. 2, a user device 201 and devices 202-1 and 202-2 included in the topology 200 may include components, at least some of which are the same as or similar to an electronic device 101 shown in FIG. 1 and may perform functions, at least some of which are the same as or similar to the electronic device 101. For example, the user device 201 and the devices 202-1 and 202-2 may include a wireless communication circuitry (e.g., at least a part of a wireless communication module 192 of FIG. 1) configured to support a Bluetooth protocol defined by the Bluetooth SIG. In this case, the wireless communication circuitry may include at least one of a Bluetooth module or a Bluetooth chip. The Bluetooth protocol may include, for example, a Bluetooth legacy protocol and a Bluetooth low energy (BLE) protocol. The wireless communication circuitry may support one or two of the Bluetooth legacy protocol or the BLE protocol.

The user device 201 may include user equipment (UE), such as a smartphone, a tablet, a desktop computer, or a laptop computer, and the devices 202-1 and 202-2 may include an accessory device, such as earphones, a headset, a speaker, a mouse, a keyboard, or a display device. According to an embodiment, each of the devices 202-1 and 202-2 may previously recognize a counterpart device (e.g., the first device 201-1 or the second device 202-2) or may previously store information (e.g., address information) of the counterpart device. For example, when the first device 202-1 and the second device 202-2 are accessory devices (e.g., earphones), they may previously recognize each other or may previously store mutual address information.

Electronic devices (e.g., the user device 201 and the devices 202-1 and 202-2), each of which supports a Bluetooth protocol, may align timings of transmission or reception of packets on the basis of a clock. The clock based on the Bluetooth protocol may include a reference clock (CLKR), a native clock (CLKN), an estimated clock (CLKE), and a master clock (CLK). The CLKR may be a system clock generated from a system of an electronic device, which may become the standard for other clocks. The CLKN may start from 0x0 with reference to the CLKR at a timing when a wireless communication circuitry (e.g., at least a part of a wireless communication module 192 of FIG. 1), which supports the Bluetooth protocol, is powered on. For example, the electronic device may operate the CLKN by applying a time-base-offset to the CLKR. The CLK may be used for synchronization between electronic devices. In this case, a channel resource (e.g., a frequency hopping channel) for transmitting packets may be generated based on a CLKN of a device which plays a master role. In a Bluetooth legacy network, a time resource (e.g., a time slot) may be determined based on a CLKN of a master device. The time slot may be, for example, 625 microseconds (us). A device which plays a slave role may be synchronized by applying an offset to the CLKN of the master device, and the CLKN of the master device may be a CLK.

The device which plays a master role may perform overall control of a physical channel as well as be the standard for determining the CLK. For example, a slave device should receive a packet from the master device to transmit the packet to the master device.

In a BLE network, the master device and the slave device may transmit a data packet every specified interval and may respond after a specified time (e.g., the inter frame space (T_IFS), about 150 us) when a data packet is received. For another example, electronic devices may determine a frequency hopping channel based on a clock and a Bluetooth device address (BD_ADDR) of the master device. According to an embodiment, the master role or the slave role may be determined in a procedure of generating a link (e.g., 205 or 210) between electronic devices (e.g., the first device 201-1 or the second device 202-2).

Each of electronic devices, which supports a Bluetooth protocol, may have a unique BD_ADDR. The BD_ADDR may be used in a media access control (MAC) layer. The BD_ADDR may include, for example, 48-bit information. The BD_ADDR may include a lower address part (LAP), an upper address part (UAP), and a non-significant part (NAP). The LAP may indicate a device address specified by a manufacturer, and the UAP and the NAP may indicate device addresses specified to the manufacturer by the institute of electrical and electronics engineers (IEEE). The BD_ADDR may be used for identifying a specific electronic device, determining a frequency hopping channel, authentication, or calculation for link operation.

Electronic devices, each of which supports the Bluetooth protocol, may insert different access codes into a packet on purposes. The access code may include, for example, a device access code (DAC), an inquiry access code (IAC), and a channel access code (CAC). The access code may be generated based on BD_ADDR of a specific electronic device. The IAC may be used to discover peripheral external electronic devices. The IAC may include a general IAC (GIAC) and a dedicated IAC (DIAC). The GIAC may be generated based on the LAP having a fixed value (e.g., 0x9E8B33), and the DIAC may be generated based on the LAP having a specified range (e.g., from 0x9E8B00 to 0x9E8B3F). The DAC may be used to request a connection. In this case, the DAC may be generated based on an LAP of an electronic device which is requested to connect. The CAC may be used for data communication in a state where two or more electronic devices are connected (e.g., a state where a link (e.g., 205 or 210) is established). The CAC may be generated based on an LAP of the master device.

The user device 201 and the devices 202-1 and 202-2 may be connected with a counterpart device based on the Bluetooth protocol to provide a user with various services. For example, when the user device 201 is a smartphone and when the first device 202-1 and the second device 202-2 are earphones constituting a set, the user device 201 may provide at least one of a healthcare, handsfree call, media playback, file sharing, or notification function via the first device 202-1 and the second device 202-2. According to a type of content included in a data packet, at least one of the devices 202-1 or 202-2 as well as the user device 201 may transmit the data packet. For example, when music is played by the user device 201, only the user device 201 may transmit a data packet, whereas, when the user device 201 makes a call, at least one of the devices 202-1 or 202-1 as well as the user device 201 may transmit a data packet including content (e.g., voice data) to the user device 201. When only the user device 201 transmits the data packet, it may be referred to as a source device and the devices 202-1 and 202-2 may be referred to as sink devices.

When the user device 201 creates or establishes a plurality of links with the plurality of devices 202-1 and 202-2 to transmit a data packet, because it is able to increase resources and power consumed by the user device 201, the user device 201 may configure only a first link 205 with the first device 202-1 and transmit a data packet over the first link 205. In this case, at least one other device (e.g., 202-2) may monitor the first link 205 to receive a data packet including content. In this case, the user device 201 may be referred to as a device under test (DUT), the first device 202-1 may be referred to as primary earbud or primary equipment (PE), and at least one other device (e.g., 202-2) may be referred to as secondary earbud or secondary equipment (SE). The operation of monitoring the link may be referred to sniffing Hereinafter, the term "monitoring" may refer to a state attempting to receive at least some of packets delivered over a corresponding link or a state capable of receiving at least some of packets. For example, when the second device 202-2 monitors the first link 205, it may receive or attempt to receive at least some of packets transmitted over the first link 205 by the user device 201 or the first device 202-1 (e.g., electronic devices configuring the first link 205). In this case, the user device 201 may fail to recognize presence of the second device 202-2 over the first link 205.

To monitor (or sniff) a data packet transmitted over the first link 205 by the second device 202-2, the first device 202-1 need to transmit information, such as a link key, used to strengthen security, to the second device 202-2. When the link key is transmitted through the air, there may be the risk of being exposed from data capture of a malicious third party.

The second device 202-2 according to various embodiments may safely perform monitoring by synchronizing information necessary to establish a link with the first device 202-1 or generate a link key before the first link 205 is established. For example, the second device 202-2 may synchronize a page scan parameter with the first device 202-1 to monitor a page procedure for the first link 205. For another example, the second device 202-2 may synchronize a scheme, for generating a secret key used to generate a link key, with the first device 202-1. For example, the second device 202-2 may synchronize at least one of a parameter or an algorithm, necessary to generate a secret key, with the first device 202-1. The secret key may be referred to as a secret integer.

Figure 3:
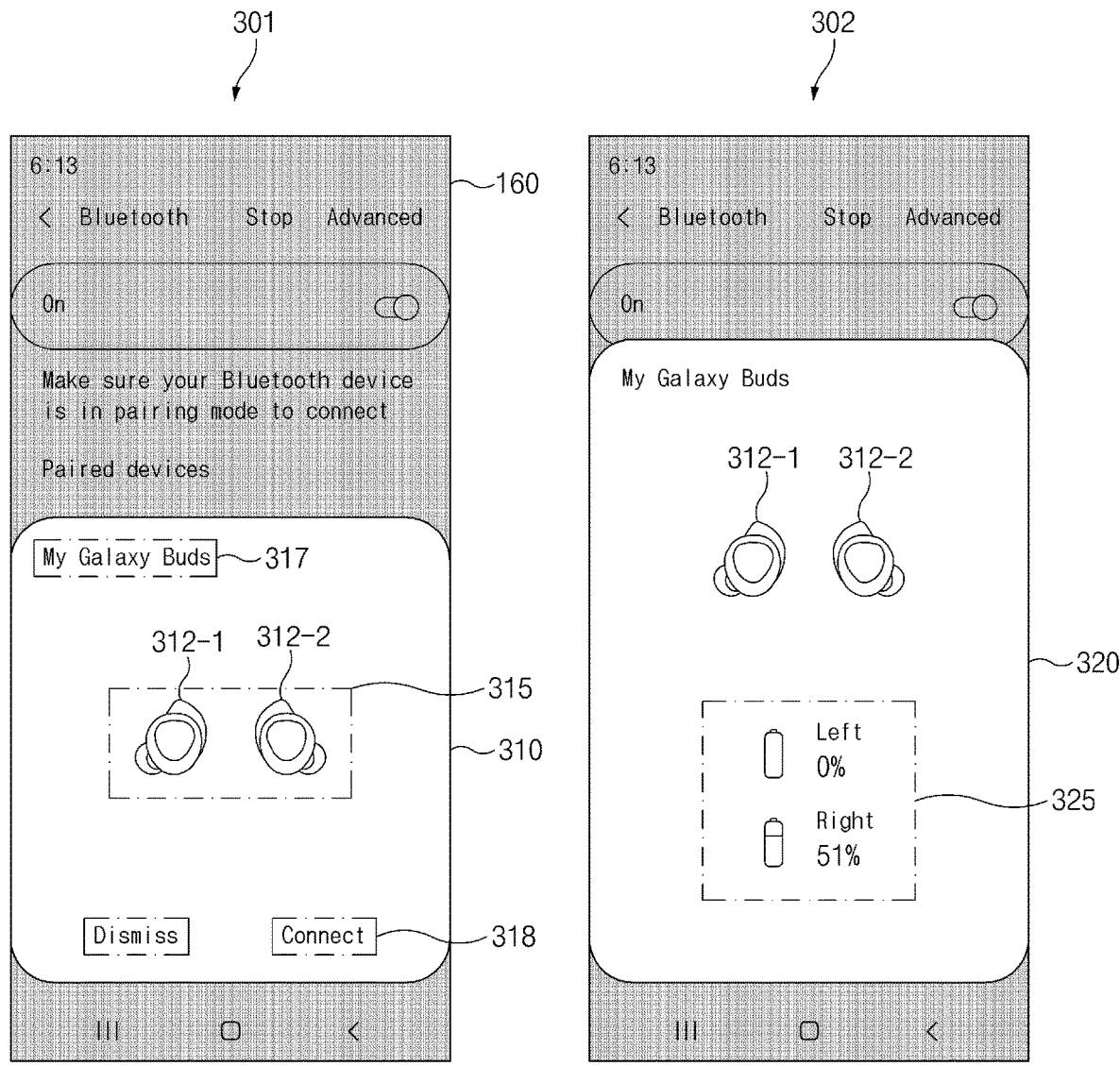
FIG. 3 illustrates a user interface (UI) indicating a connection between devices in a Bluetooth network environment according to an embodiment of the disclosure.

FIG. 3 illustrates a user interface (UI) indicating a connection between devices in a Bluetooth network environment according to an embodiment of the disclosure. FIG. 3 illustrates an embodiment where a plurality of external electronic devices 312-1 and 312-2 (e.g., devices 202-1 and 202-2 of FIG. 2) are composed of a set for an electronic device (e.g., a user device 201 of FIG. 2), but the same principle is applicable to a user interface indicating only a connection between the electronic device and one external electronic device (e.g., the first device 202-1 of FIG. 2).

Referring to FIG. 3, in reference numeral 301, the electronic device may recognize the first external electronic device 312-1 by receiving an advertising signal transmitted from the first external electronic device 312-1 and may output a first user interface 310, for notifying a user of the recognized first external electronic device 312-1 and the second external electronic device 312-2 constituting a set with the first external electronic device 312-1, on a display device 160 (e.g., a display).

The first user interface 310 may include at least one of, for example, an image 315 indicating shapes of the first external electronic devices 312-1 and the second external electronic device 312-2 or a text 317 indicating a device name (e.g., "My Galaxy Buds") of the first external electronic device 312-1 and the second external electronic device 312-2. For another example, although not illustrated in FIG. 3, the first user interface 310 may indicate whether there is a history where the first external electronic device 312-1 or the second external electronic device 312-2 are previously connected.

According to an embodiment, the advertising signal may include information for a connection (or a pairing or link establishment) between the electronic device and the first external electronic device 312-1. For example, the advertising signal may include at least one of identification information of the first external electronic device 312-1, user account information, current pairing information indicating whether the first external electronic device 312-1 is pairing with another device, a pairing list indicating a list of devices with which the first external electronic device 312-1 is previously paired, simultaneous pairing information indicating a device capable of simultaneously pairing with the first external electronic device 312-1, a transmit power, a sensing region, or battery state information. For another example, when the first external electronic device 312-1 constitutes a set with the second external electronic device 312-2, the advertising signal may further include at least one of identification information of the second external electronic device 312-2, user account information, current pairing information indicating whether the second external electronic device 312-2 is pairing with another device, a pairing list indicating a list of devices with which the second external electronic device 312-2 is previously paired, simultaneous pairing information indicating a device capable of simultaneously pairing with the second external electronic device 312-2, a transmit power, a sensing region, or battery state information.

According to an embodiment, the first external electronic device 312-1 may transmit an advertising signal in a multicast scheme or a broadcast scheme.

According to an embodiment, the first external electronic device 312-1 may transmit an advertising signal depending on a condition for performing advertising. For example, the first external electronic device 312-1 may transmit an advertising signal in response to detecting that cases stored in the first external electronic device 312-1 and the second external electronic device 312-2 are opened. For another example, the first external electronic device 312-1 may transmit an advertising signal in response to receiving power or receiving a user input. For another example, the first external electronic device 312-1 may transmit an advertising signal every specified period.

According to an embodiment, the electronic device may establish a first link (e.g., a link 205 of FIG. 2) with the first external electronic device 312-1 in response to receiving a user input 318 for requesting to connect with the first external electronic device 312-1 or automatically without a user input. According to an embodiment, the electronic device and the first external electronic device 312-1 may establish a link depending on a procedure based on Bluetooth standards. For example, the electronic device and the first external electronic device 312-1 may perform a baseband page procedure for recognizing a counterpart device, a link manager protocol (LMP) procedure for identifying an LMP version, a clock offset, and a supported function (e.g., a supported feature), a host request/response procedure for identifying a connection, an authentication procedure for identifying whether the counterpart device is a reliable device, an encryption procedure, a setup complete procedure for notifying a host that the connection (e.g., the establishment of the link) is completed, and a service discovery protocol (SDP) for connecting a profile.

When the link is established, as shown in reference numeral 302, the electronic device may output a second user interface 320, indicating that the first external electronic device 312-1 is connected with the electronic device, on the display device 160. The second user interface 320 may further include, for example, an image 325 indicating battery states of the first external electronic device 312-1 and the second external electronic device 312-2 constituting a set with the first external electronic device 312-1.

Although not illustrated in FIG. 3, according to an embodiment, when the first external electronic device 312-1 is discovered in a state where the electronic device is previously connected with an external device except for the first external electronic device 312-1 and the second external electronic device 312-2, the electronic device may transmit information about a previously connected link to the first external electronic device 312-1 or the second external electronic device 312-2, such that the first external electronic device 312-1 or the second external electronic device 312-2 may monitor the link previously connected between the electronic device and the first external electronic device 312-1. In this case, the first user interface 310 may include information indicating that it is able to add the first external electronic device 312-1 or the second external electronic device 312-2. When a user input for requesting to add the first external electronic device 312-1 or the second external electronic device 312-2 is received, the electronic device may transmit information about a previously connected link to the first external electronic device 312-1 or the second external electronic device 312-2.

FIG. 3 illustrates an embodiment of outputting a user interface depending on an advertising signal based on a BLE protocol, but, according to other embodiments, the electronic device may output a user interface based on a Bluetooth legacy protocol. For example, the electronic device may receive a frequency hopping synchronization (FHS) packet and/or an extended inquiry response (EIR) packet from the first external electronic device 312-1 through an inquiry and may output the first user interface 310 based on information included in the FHS packet and/or the EIR packet. When the user input 318 for requesting the connection is received, the electronic device may establish a link with the first external electronic device 312-1 through a page.

In FIGS. 2 and 3, the link established between the user device 201 and the first device 202-1 is referred to as the 'first link' and the link established between the first device 202-1 and the second device 202-2 is referred to as the 'second link'. However, in embodiments described below, because the link between the first device 202-1 and the second device 202-2 is established earlier than the link between the user device 201 and the first device 202-1, the link between the first device 202-1 and the second device 202-2 may be referred to a 'first link' and the link between the user device 201 and the first device 202-1 may be referred to as a 'second link'.

Figure 4:
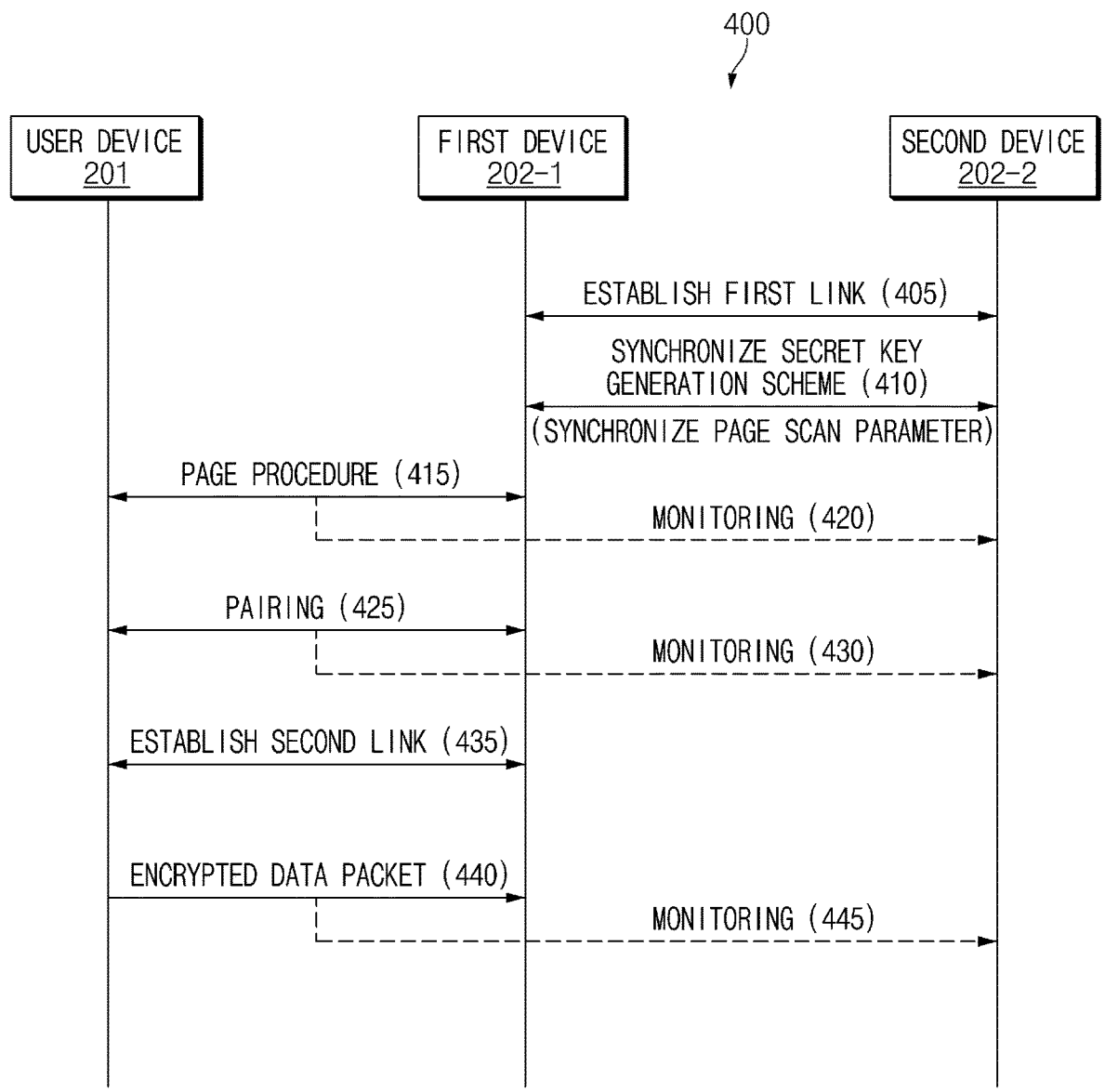
FIG. 4 illustrates a signal sequence diagram for monitoring a packet according to an embodiment of the disclosure.

FIG. 4 illustrates a signal sequence diagram 400 of monitoring packets according to an embodiment of the disclosure.

Referring to FIG. 4, in operation 405, a first device 202-1 may establish a first link (e.g., a second link 210 of FIG. 2) based on a Bluetooth protocol with a second device 202-2. For example, one of the first device 202-1 or the second device 202-2 may transmit an advertising signal based on a BLE protocol, and the other may recognize each other by receiving the advertising signal and may establish the first link. For another example, the first device 202-1 and the second device 202-2 may recognize each other through an inquiry procedure and may establish the first link through a page and a page scan. The procedure of establishing the first link may refer to the description of FIGS. 2 and 3.

In operation 410, the first device 202-1 and the second device 202-2 may synchronize a secret key generation scheme. The secret key may be used to generate a link key. According to an embodiment, the first device 202-1 and the second device 202-2 may synchronize the secret key generation scheme through information obtained while establishing the first link. The information obtained while establishing the first link may include at least one of, for example, an authentication key, a link key, an encryption key, master clock information at an initial connection time between the first device 202-1 and the second device 202-2, or clock information at a time when a specific packet (e.g., an identification (ID) packet) is received. The first device 202-1 and the second device 202-2 may select at least one parameter to be used for calculation for generating a secret key among the information obtained while establishing the first link and may generate the secret key using the selected parameter and programmed calculation.

According to another embodiment, the secret key generation scheme may be stored in the first device 202-1 and the second device 202-2 before the first link is established. For example, when the first device 202-1 and the second device 202-2 are devices (e.g., earphones) constituting one set, at least one parameter for generating a secret key may be stored in the first device 202-1 and the second device 202-2 and calculation for generating the secret key may be programmed in the first device 202-1 and the second device 202-2.

According to an embodiment, the first device 202-1 and the second device 202-2 may synchronize a page scan parameter as well as the secret key generation scheme. The page scan parameter may refer to a parameter required to perform a page scan. The page scan parameter may include at least one of, for example, a starting channel, a starting timing, a page period, a page time, or a frequency hopping channel. An embodiment of performing the page scan using the synchronized page scan parameter will be described with reference to FIG. 6 or 7.

According to another embodiment, when performing a page scan using only Bluetooth address information of the first device 202-1, the first device 202-1 and the second device 202-2 may fail to synchronize a page scan parameter.

In operation 415, the first device 202-1 may perform a page procedure, for establishing a second link (e.g., a first link 205 of FIG. 2), with a user device 201. For example, the user device 201 may perform a page operation, and the first device 202-1 may perform a page scan.

In operation 420, the second device 202-2 may monitor the page procedure between the first device 202-1 and the user device 201. For example, the second device 202-2 may receive page information (e.g., an ID packet) transmitted from the user device 201 based on a synchronized page scan parameter, in the same manner as the first device 202-1. The second device 202-2 may previously recognize a procedure of establishing the second link between the first device 202-1 and the user device 201 by monitoring the page procedure. An embodiment of monitoring the page procedure will be described with reference to FIG. 5.

In operation 425, the first device 202-1 may be paired with the user device 201. For example, each of the first device 202-1 and the user device 201 may exchange its public key and may generate a link key by calculating a public key of a counterpart device and its secret key. Each of the first device 202-1 and the user device 201 may exchange a check value of the link key and may identify whether mutual link keys are the same as each other by calculating a check value of a counterpart device and its link key. The link key may be used to verify that it is possible to connect because it is reliable between electronic devices or encrypt or decrypt a data packet. The first device 202-1 and the user device 201 may strengthen security through pairing.

In operation 430, the second device 202-2 may generate the same link key as the link key of the first device 202-1 by monitoring pairing (or a pairing procedure) between the first device 202-1 and the user device 201 using the synchronized secret key generation scheme. For example, the second device 202-2 may generate the same secret key as the secret key generated by the first device 202-1 based on the synchronized secret key generation scheme. The second device 202-2 may obtain the public key of the user device 201, transmitted to the first device 202-1 by the user device 201, and may generate the same link key as a link key generated by the first device 202-1 based on the obtained public key of the user device 201 and the generated secret key.

In operation 435, the first device 202-1 may establish a second link with the user device 201. That the second link is established may refer to a state capable of transmitting and receiving an encrypted data packet between the first device 202-1 and the user device 201. For example, the first device 202-1 and the user device 201 may be in a connection state according to Bluetooth standards.

In operation 440, the user device 201 may transmit the encrypted data packet to the first device 202-1 over the second link. The data packet may be encrypted based on the link key generated through the pairing in operation 425. For example, the user device 201 may generate an encryption key based on the link key and may encrypt a data packet using the generated encryption key.

In operation 445, the second device 202-2 may receive and decrypt the encrypted data packet transmitted from the user device 201 to the first device 202-1, using the link key obtained through the monitoring in operation 430. For example, the second device 202-2 may generate an encryption key using the link key and may decrypt the data packet obtained through the monitoring, using the generated encryption key.

Although not illustrated in FIG. 4, the second device 202-2 may transmit a response message to the data packet received from the user device 201 to the user device 201 over the second link. For example, the second device 202-2 may fail to transmit a response message when normally receiving the data packet from the user device 201, and may transmit a negative acknowledgement (NACK) message to the user device 201 before the first device 202-1 transmits a response message when not normally receiving the data packet from the user device 201. The user device 201 may retransmit the same data packet as the previously transmitted data packet in response to the received NACK message, and the second device 202-2 may receive the retransmitted data packet through monitoring.

Figure 5:
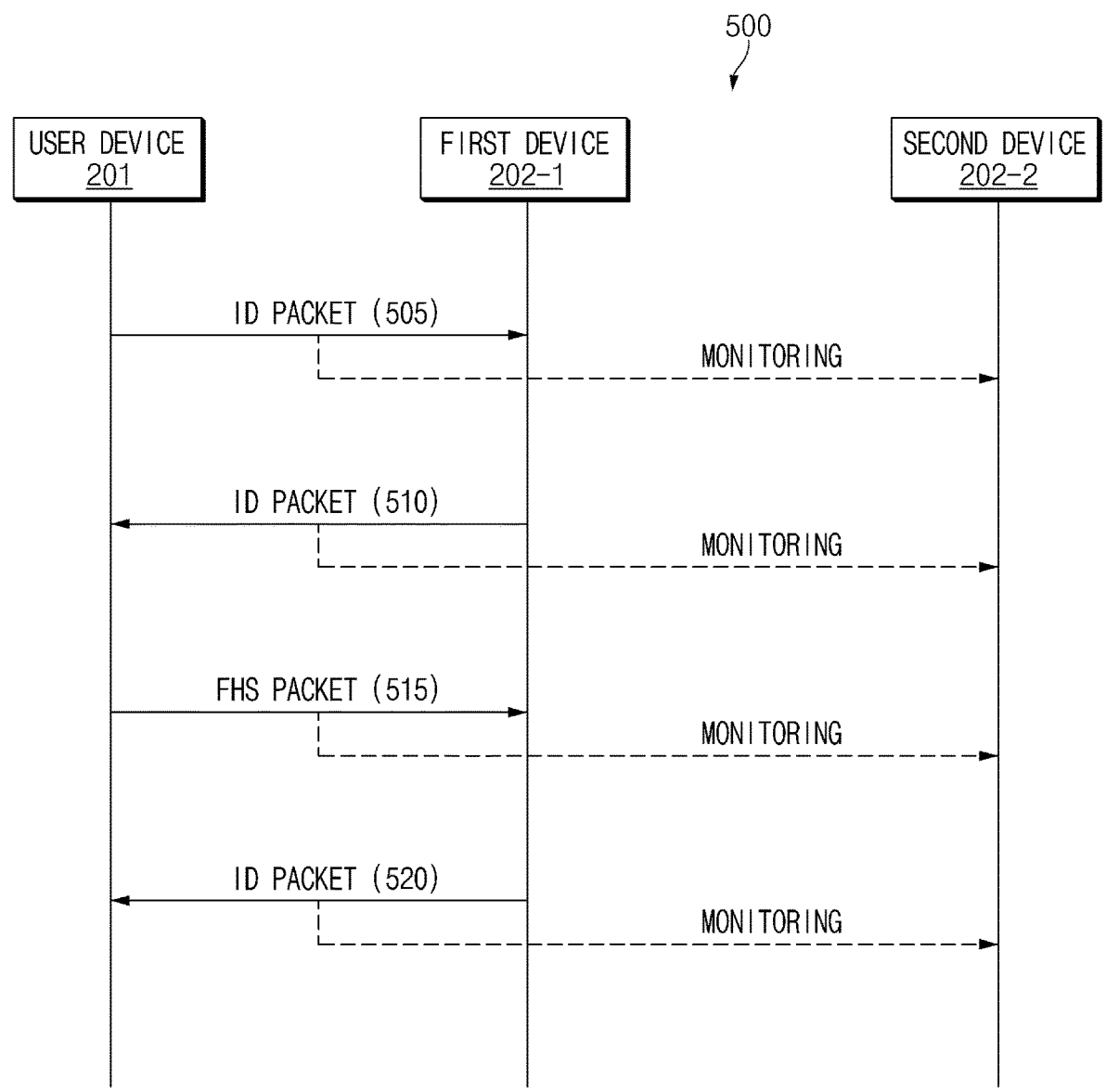
FIG. 5 illustrates a signal sequence diagram for monitoring a page procedure according to an embodiment of the disclosure.

FIG. 5 illustrates a signal sequence diagram 500 of monitoring a page procedure according to an embodiment of the disclosure.

Electronic devices, each of which supports a Bluetooth protocol, may perform a page and a page scan to establish a link based on the Bluetooth protocol (or connect) with an external electronic device discovered through an inquiry. A device which requests a connection may be referred to as a page device, and a device which is requested to connect may be referred to a page scan device. The page device may generate a DAC using BD_ADDR of the page scan device and may transmit an ID packet including the DAC during a specified period (e.g., 1.28 s*4 or 1.28 s*5). The page scan device may attempt to receive an ID packet at a specified period (e.g., for 11.25 ms per 1.28 s). According to an embodiment, the operation of transmitting the ID packet or attempting to receive the ID packet may be repeated until a counterpart device is discovered (or recognized). The page device and the page scan device may transmit and receive an ID packet while hopping a frequency channel using the BD_ADDR of the page scan device. When the ID packet is received, the page scan device may transmit the same ID packet as the received ID packet to the page device.

When the ID packet is received from the page scan device, the page device may transmit an FHS packet including BD_ADDR, clock information, and a logical transport (LT) address of the page device to the page scan device. The page scan device may transmit an ID packet to the page device to notify the page device that the FHS packet of the page device is received. When the ID packet is transmitted, an additional procedure (e.g., pairing) for establishing a link between the page device and the page scan device may be performed. When the link is established, the page device and the page scan device may transmit or receive a packet by hopping a frequency channel using the BD_ADDR of the page device.

Referring to FIG. 5, a user device 201 may perform a page, and a first device 202-1 may perform a page scan. FIG. 5 illustrates an example where the user device 201 is the page device and where the first device 202-1 is the page scan device, but, according to other embodiments, the user device 201 may be a page scan device and the first device 202-1 may be a page device. In FIG. 5, it may be assumed that a second device 202-2 is in a state capable of monitoring a page procedure using Bluetooth address information of the first device 202-1 or a synchronized page scan parameter.

In operation 505, the user device 201 may transmit an ID packet to the first device 202-1. The ID packet may include, for example, a DAC of the first device 202-1, which is generated based on BD_ADDR of the first device 202-1. The user device 201 may transmit an ID packet while hopping a frequency channel every specified interval. The first device 202-1 may attempt to receive an ID packet while hopping a frequency channel every specified interval.

In operation 510, the first device 202-1 may transmit the same ID packet as the ID packet received from the user device 201 to the user device 201. For example, the ID packet transmitted in operation 510 may include the DAC of the first device 202-1.

In operation 515, the user device 201 may transmit an FHS packet to the first device 202-1. For example, the user device 201 may transmit an FHS packet including BD_ADDR, clock information, and an LT address of the user device 201 to the first device 202-1.

In operation 520, the first device 202-1 may transmit an ID packet to the user device 201 to notify the user device 201 that the FHS packet is normally received.

According to various embodiments, the second device 202-2 may monitor operations 505 to 520. For example, the second device 202-2 may perform monitoring to receive the ID packet or the FHS packet transmitted from the user device 201. The second device 202-2 may generate the DAC of the first device 202-1 using the BD_ADDR of the first device 202-1 and may attempt to receive a packet including the DAC of the first device 202-1. The second device 202-2 may obtain the BD_ADDR of the first device 202-1 from the first device 202-1 while establishing a first link (e.g., a second link 210 of FIG. 2) with the first device 202-1. The second device 202-2 may attempt to receive a packet while hopping a frequency channel using the BD_ADDR of the first device 202-1. The second device 202-2 may identify that a target requested to establish a link by the user device 201 is the first device 202-1 through the BD_ADDR of the FHS packet transmitted from the user device 201. Furthermore, the second device 202-2 may generate a link key using the BD_ADDR of the FHS packet transmitted from the user device 201.

According to an embodiment, when synchronizing a page scan parameter with the first device 202-1, the second device 202-2 may perform a page scan in the same manner as the first device 202-1 based on at least one of a synchronized starting channel, a synchronized starting timing, or a synchronized page period.

According to another embodiment, when not synchronizing the page scan parameter, the second device 202-2 may perform a page scan based on the clock information used when obtaining the BD_ADDR of the first device 202-1. For example, the second device 202-2 may control a duty of the second device 202-2 such that the duty of the second device 202-2 is wider than a duty (e.g., per 11.25 ms per 1.28 s) used by the first device 202-1 for a page scan and includes a duty of the first device 202-1.

Figure 6:
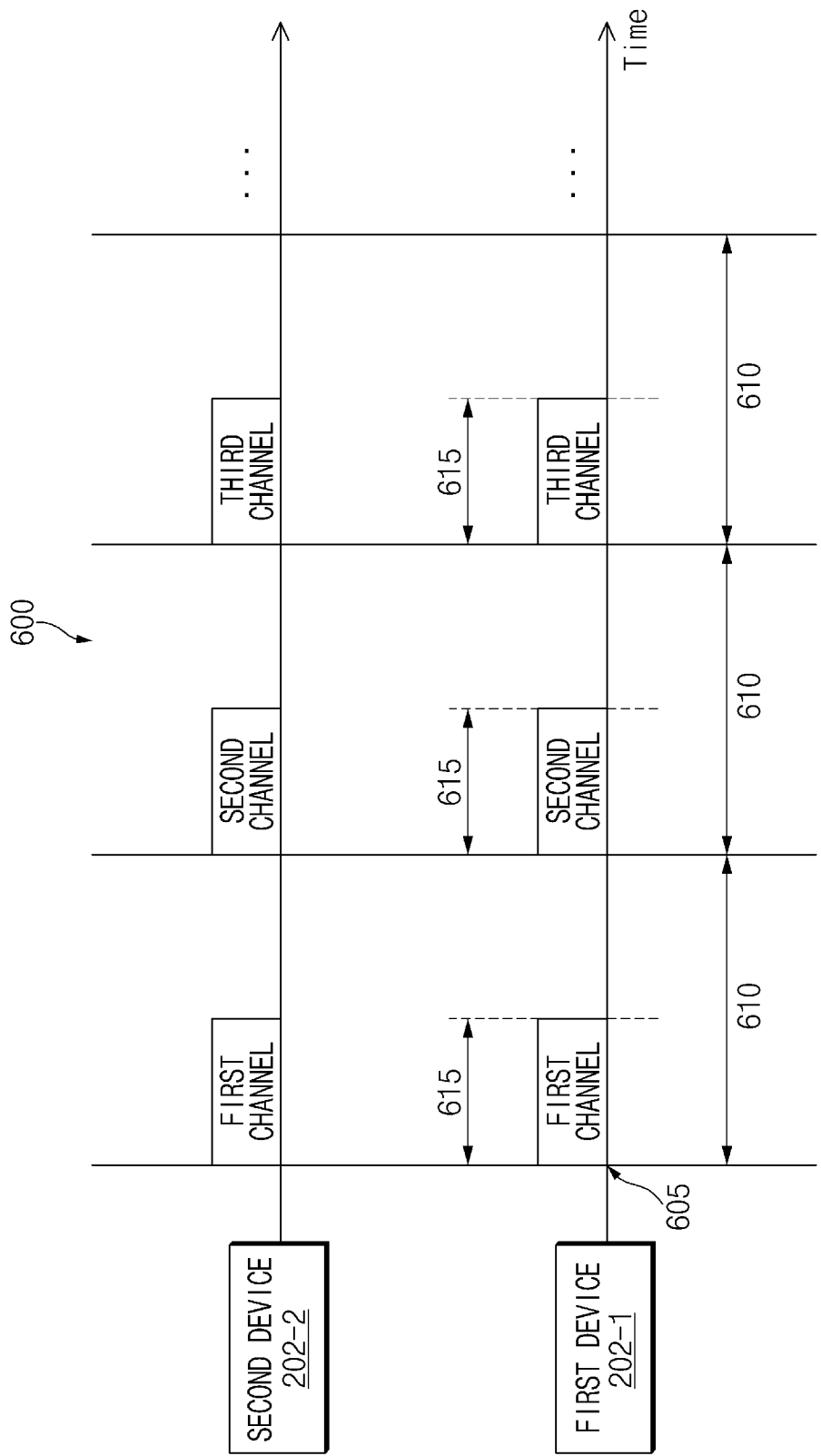
FIG. 6 illustrates an example of an operation of opening a receive (Rx) window according to an embodiment of the disclosure.
Figure 7:
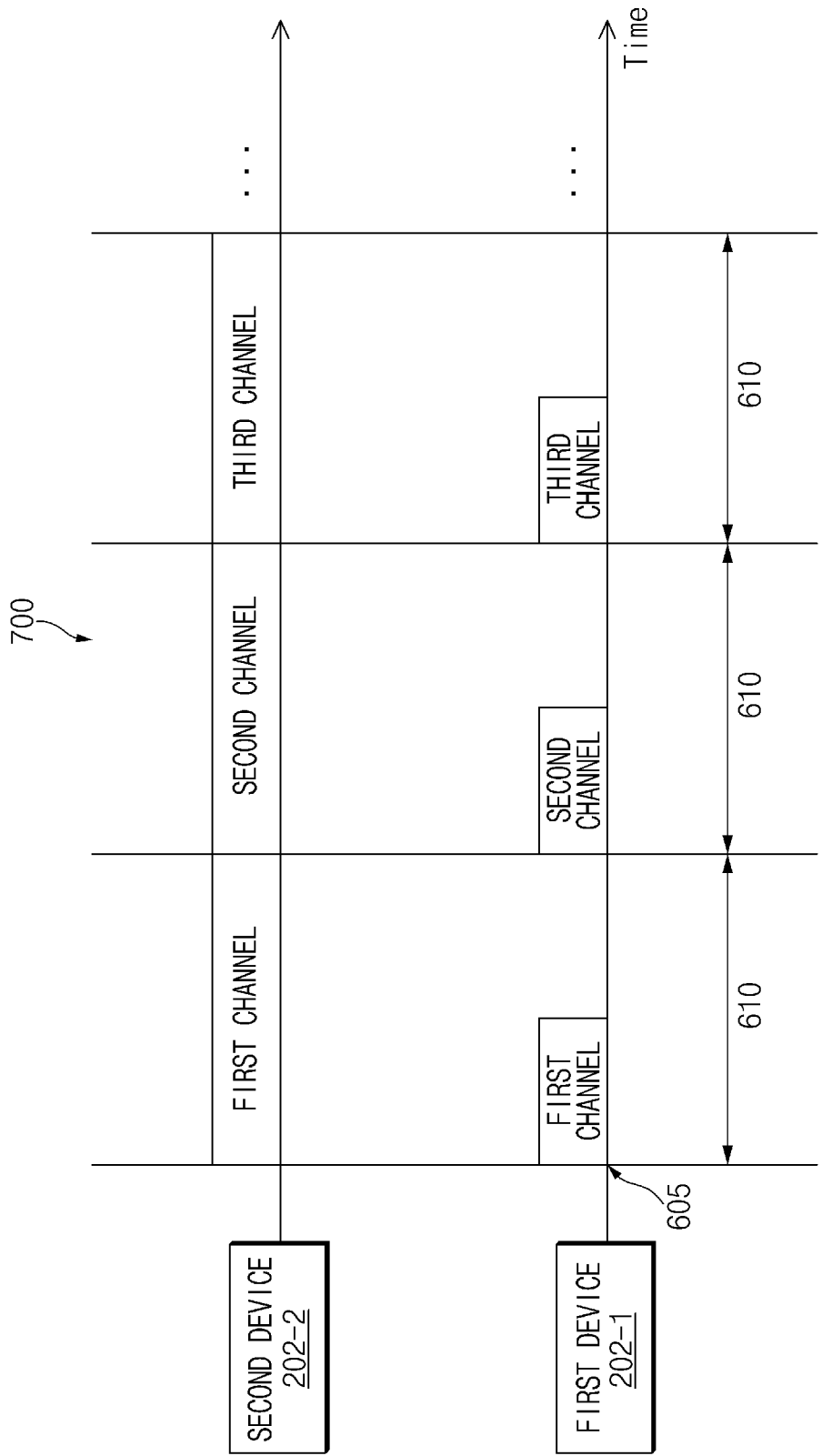
FIG. 7 illustrates another example of an opening an Rx window according to an embodiment of the disclosure.

FIGS. 6 and 7 illustrate examples of an operation of opening an Rx window according to various embodiments of the disclosure. The horizontal axis of graph 600 or 700 may indicate time.

A page scan device may open an Rx window on a specified channel during a specified time to receive page information (e.g., an ID packet or an FHS packet) transmitted from a page device.

Referring to FIG. 6, a first device 202-1 may start a page scan at a specified starting timing 605 and on a specified starting channel (e.g., a first channel). The first device 202-1 may hop frequency channels (e.g., a first channel, a second channel, and a third channel) every specified page period 610. The first device 202-1 may open an Rx window during a specified page time 615 in a specified page period 610. A second device 202-2 may start a page scan at the same starting timing 605 and on the same starting channel (e.g., the first channel) as the first device 202-1 based on a synchronized page scan parameter, may hop the same frequency channels (e.g., the first channel, the second channel, and the third channel) every the same page period 610, and may open an Rx window during the same page time 615.

According to another embodiment, when some of page scan parameters are not synchronized, the second device 202-2 may perform a page scan using BD_ADDR and clock information of the first device 202-1.

Referring to FIG. 7, the second device 202-2 may hop a frequency channel to the same channels as the first device 202-1 based on the BD_ADDR of the first device 202-1, whereas it may open an Rx window during a specified period 610. For another example, although not illustrated in FIG. 7, the second device 202-2 may perform a page scan by continuing opening the Rx window on the same channel (e.g., the first channel) without hopping a frequency channel.

According to various embodiments, the second device 202-2 may selectively perform an embodiment described with reference to FIG. 6 and an embodiment described with reference to FIG. 7 based on at least one of a battery state or a communication state of the second device 202-2. For example, when a battery of the second device 202-2 is greater than or equal to a threshold, as shown in FIG. 7, the second device 202-2 may continue opening the Rx window. For another example, when the battery of the second device 202-2 is less than the threshold, as shown in FIG. 6, the second device 202-2 may continue opening the Rx window during the specified time 615.

Figure 8:
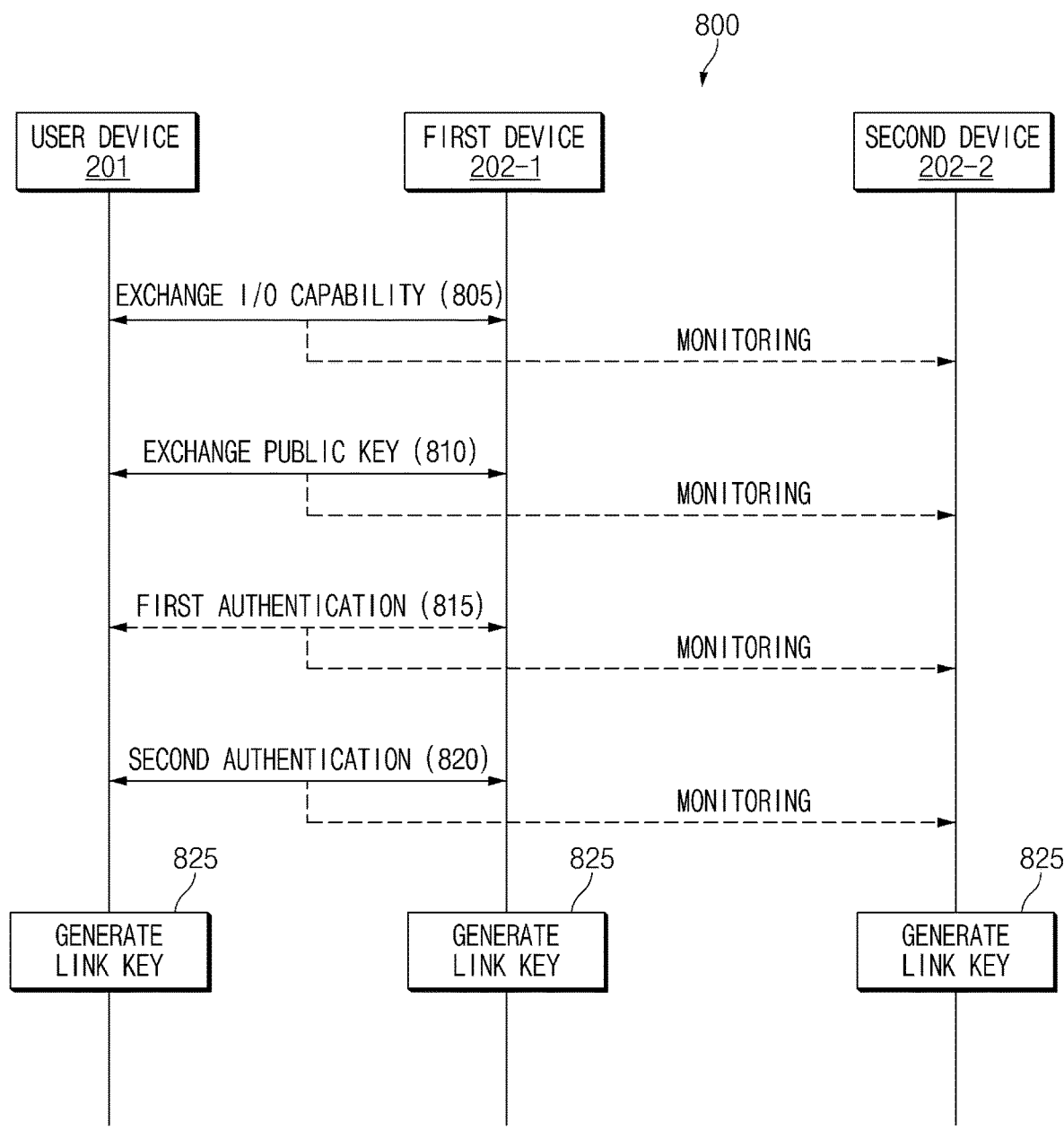
FIG. 8 illustrates a signal sequence diagram for monitoring a pairing procedure according to an embodiment of the disclosure.

FIG. 8 illustrates a signal sequence diagram 800 of monitoring a pairing procedure according to an embodiment of the disclosure.

Electronic devices, each of which supports a Bluetooth protocol, may perform a pairing procedure of generating one or more shared keys for security. For example, electronic devices, each of which conforms to a specification of Bluetooth version 2.0 or earlier, may perform basic rate/enhanced data rate (BR/EDR) legacy pairing, and electronic devices, each of which conforms to a specification of Bluetooth version 2.1 or later, may perform secure simple pairing (SSP) to enhance security and simplify a pairing procedure of a user. The SSP may use an elliptic curve Diffie Hellman (ECDH) public key encryption scheme to strengthen security. The SSP may include four models (or algorithms). The four models may include just work, numeric comparison, passkey entry, and out of bound (OOB).

Referring to FIG. 8, a user device 201 and a first device 202-1 may be paired with each other based on the SSP.

In operation 805, the user device 201 and the first device 202-1 may exchange input/output (I/O) capability. Based on an I/O capability of a counterpart device, the user device 201 and the first device 202-1 may select one of the four models to be used for the SSP.

In operation 810, the user device 201 and the first device 202-1 may exchange a public key. According to the ECDH public key encryption scheme, the user device 201 and the first device 202-1 may generate a public key by calculating a previously shared common key and a separately generated secret key.

In operation 815, the user device 201 and the first device 202-1 may perform first authentication by a user using a shared public key. For example, the user device 201 and the first device 202-1 may generate a six-digit number by calculating the shared public key and a random number and may perform the first authentication by the user using the selected model among the four models. According to an embodiment, when the first device 202-1 is a device which does not include both of an input device and an output device, the user device 201 and the first device 202-1 may omit operation 815.

In operation 820, each of the user device 201 and the first device 202-1 may identify whether its Diffie Hellman (DH) key and a DH key of a counterpart device are the same as each other to perform second authentication. For example, the user device 201 may generate a DH key of the user device 201 by calculating a public key of the first device 202-1 and a secret key of the user device 201. The first device 202-1 may generate a DH key of the first device 202-1 by calculating a public key of the user device 201 and a secret key of the first device 202-1. Each of the first device 202-1 and the user device 201 may exchange a check value of the generated DH key and may identify whether mutual DH keys are the same as each other by calculating a check value of a DH key of a counterpart device and its DH key.

According to various embodiments, the second device 202-2 may monitor at least one of operations 805 to 820. For example, the second device 202-2 may receive the public key of the user device 201. The second device 202-2 may generate the same DH key of the second device 202-2 as the DH key of the first device 202-1 by calculating a secret key generated by a synchronized secret key generation scheme and the public key of the user device 201. For another example, the second device 202-2 may receive the check value of the DH key of the user device 201 through monitoring and may identify whether an exchange of a public key and a secret key necessary for authentication is successfully performed by calculating the received check value of the DH key and the DH key of the second device 202-2.

When the first authentication and the second authentication are completed, in operation 825, each of the user device 201, the first device 202-1, and the second device 202-2 may generate a link key. According to an embodiment, each of the user device 201 and the first device 202-1 may generate a link key by calculating the DH key, its BD_ADDR, and BD_ADDR of a counterpart device. The second device 202-2 may generate the same link key of the second device 202-2 as the link key of the first device 202-1 by calculating the DH key of the second device 202-2, the BD_ADDR of the first device 202-1, and the BD_ADDR of the user device 201.

According to various embodiments, a secret key generation scheme synchronized between the first device 202-1 and the second device 202-2 may be used a plurality of times. For example, although a connection between the first device 202-1 and the second device 202-2 is released (or deleted) or although a pairing between the first device 202-1 and the second device 202-2 is deleted, the secret key generation scheme may fail to be deleted. For another example, when the first device 202-1 establishes a third link with another electronic device except for the user device 201 and when the second device 202-2 monitors the third link, the first device 202-1 and the second device 202-2 may apply the secret key generation scheme synchronized to monitor the second link to the third link.

Figure 9:
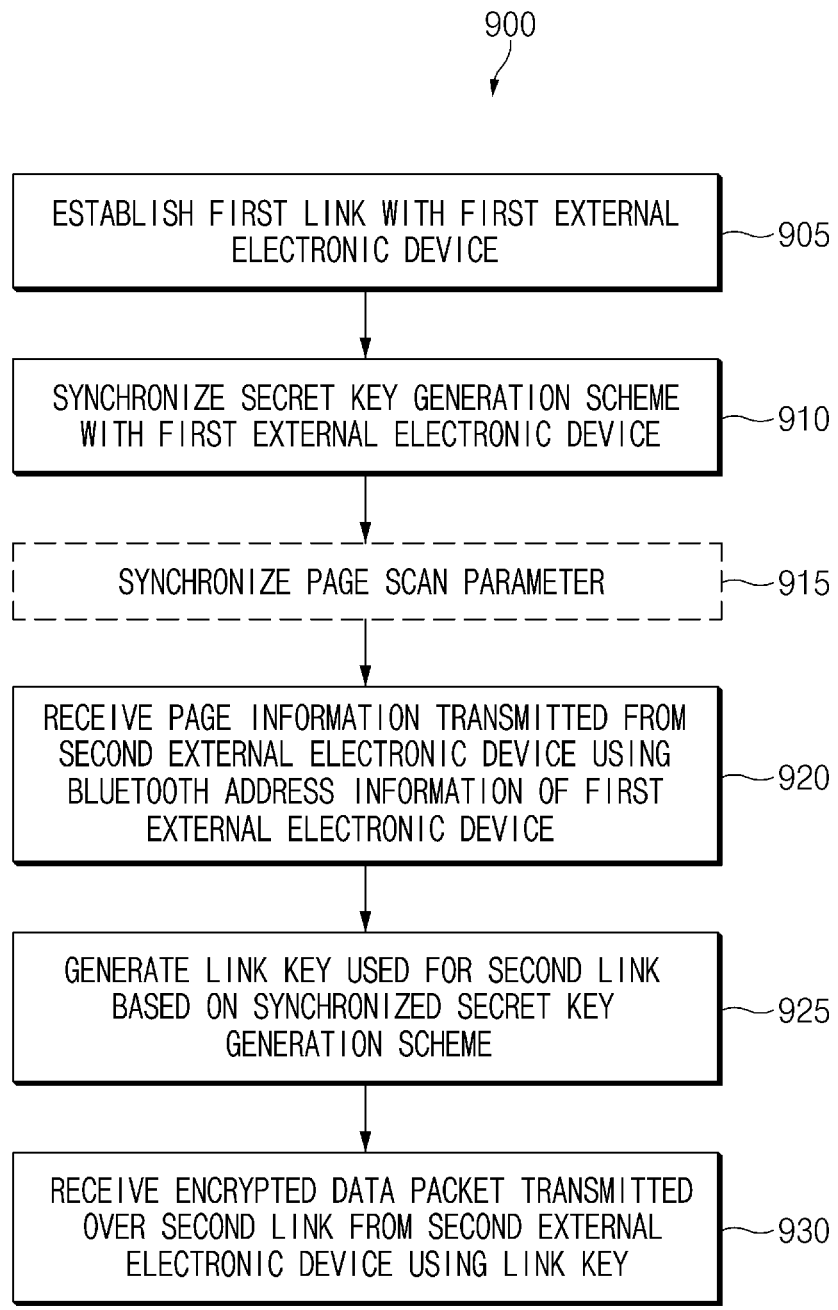
FIG. 9 illustrates an operational flowchart of an electronic device for receiving a data packet according to an embodiment of the disclosure.

FIG. 9 illustrates an operational flowchart 900 of an electronic device (e.g., a second device 202-2 of FIG. 2) for receiving a data packet according to an embodiment of the disclosure. Operations of the operational flowchart described below may be performed by an electronic device or a component (e.g., a processor 120 or a wireless communication module 192 of FIG. 1) of the electronic device.

Referring to FIG. 9, in operation 905, the electronic device may establish a first link (e.g., a second link 210 of FIG. 2) based on a Bluetooth protocol with a first external electronic device (e.g., a first device 202-1 of FIG. 2).

In operation 910, the electronic device may synchronize a secret key generation scheme with the first external electronic device. For example, the electronic device may synchronize the secret key generation scheme using at least one of an authentication key obtained while establishing the first link, an encryption key, master clock information at an initial connection time between the electronic device and the first external electronic device, or clock information at a time when a specific packet is received.

In operation 915, the electronic device may synchronize a page scan parameter, required to perform a page scan, with the first external electronic device. The page scan parameter may include at least one of, for example, a starting channel, a starting timing, a page period, a page time, or a frequency hopping channel.

According to another embodiment, the electronic device may fail to synchronize the page scan parameter. In this case, the electronic device may omit operation 915.

In operation 920, the electronic device may receive page information (e.g., an ID packet) transmitted from a second external electronic device (e.g., a user device 201 of FIG. 2) using Bluetooth address information (e.g., BD_ADDR) of the first external electronic device. For example, the electronic device may obtain the Bluetooth address information of the first external electronic device while establishing the first link. The electronic device may identify a DAC of the first external electronic device using the Bluetooth address information of the first external electronic device and may attempt to receive page information including the same DAC as the identified DAC.

According to an embodiment, when synchronizing a page scan parameter with the first external electronic device, the electronic device may open an Rx window for receiving page information using the synchronized parameter. According to another embodiment, when the page scan parameter is not synchronized, the electronic device may attempt to receive page information based on the Bluetooth address information and clock information of the first external electronic device.

In operation 925, the electronic device may generate a link key used for a second link (e.g., a first link 205 of FIG. 2) between the first external electronic device and the second external electronic device based on the synchronized secret key generation scheme. According to an embodiment, the electronic device may generate the same secret key as that of the first external electronic device based on the synchronized secret key generation scheme. The electronic device may obtain a public key of the second external electronic device and the first external electronic device by monitoring a pairing procedure between the first external electronic device and the second external electronic device and may generate the same link key as that of the first external electronic device by calculating the obtained public key and the generated secret key.

In operation 930, the electronic device may receive (or process) an encrypted data packet transmitted over the second link from the second external electronic device using the generated link key.

Figure 10:
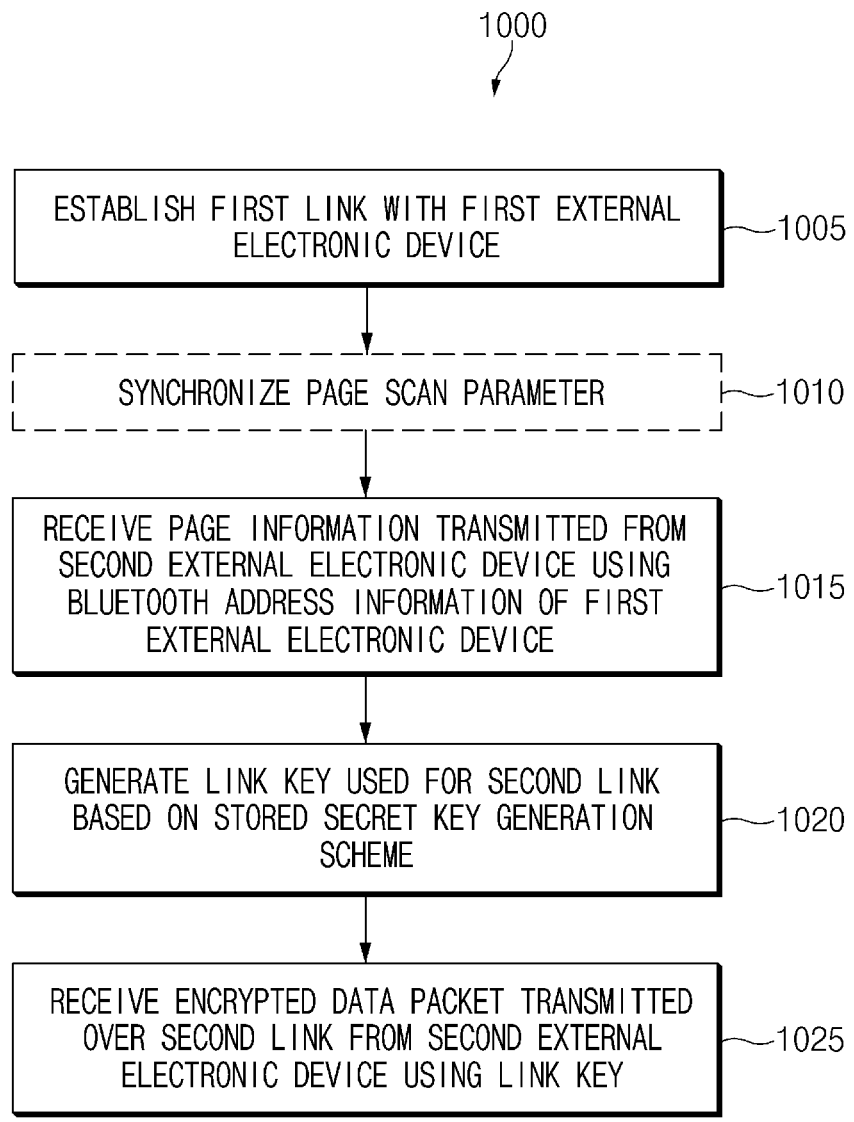
FIG. 10 illustrates another operational flowchart of an electronic device for receiving a data packet according to an embodiment of the disclosure.

FIG. 10 illustrates another operational flowchart 1000 of an electronic device (e.g., a second device 202-2 of FIG. 2) for receiving a data packet according to an embodiment of the disclosure.

Referring to FIG. 10, in operation 1005, the electronic device may establish a first link (e.g., a second link 210 of FIG. 2) based on a Bluetooth protocol with a first external electronic device (e.g., a first device 202-1 of FIG. 2).

In operation 1010, the electronic device may synchronize a page scan parameter, required to perform a page scan, with the first external electronic device. The page scan parameter may include at least one of, for example, a starting channel, a starting timing, a page period, a page time, or a frequency hopping channel According to another embodiment, the electronic device may fail to synchronize the page scan parameter. In this case, the electronic device may omit operation 1010.

In operation 1015, the electronic device may receive page information (e.g., an ID packet) transmitted from a second external electronic device (e.g., a user device 201 of FIG. 2) using Bluetooth address information (e.g., BD_ADDR) of the first external electronic device. For example, the electronic device may obtain the Bluetooth address information of the first external electronic device while establishing the first link. According to an embodiment, when synchronizing a page scan parameter with the first external electronic device, the electronic device may open an Rx window for receiving page information using the synchronized parameter. According to another embodiment, when the page scan parameter is not synchronized, the electronic device may attempt to receive page information based on the Bluetooth address information and clock information of the first external electronic device.

In operation 1020, the electronic device may generate a link key used for a second link (e.g., a first link 205 of FIG. 1) between the first external electronic device and the second external electronic device based on a stored secret key generation scheme. For example, when the electronic device and the first external electronic device are devices composed of one set, a synchronized secret key generation scheme may be previously stored in the electronic device and the first external electronic device. The electronic device may generate the same secret key as that of the first external electronic device based on the stored secret key generation scheme. The electronic device may obtain a public key of the second external electronic device and the first external electronic device by monitoring a pairing procedure between the first external electronic device and the second external electronic device and may generate the same link key as that of the first external electronic device by calculating the obtained public key and the generated secret key.

In operation 1025, the electronic device may receive (or process) an encrypted data packet transmitted over the second link from the second external electronic device using the generated link key.

Figure 11:
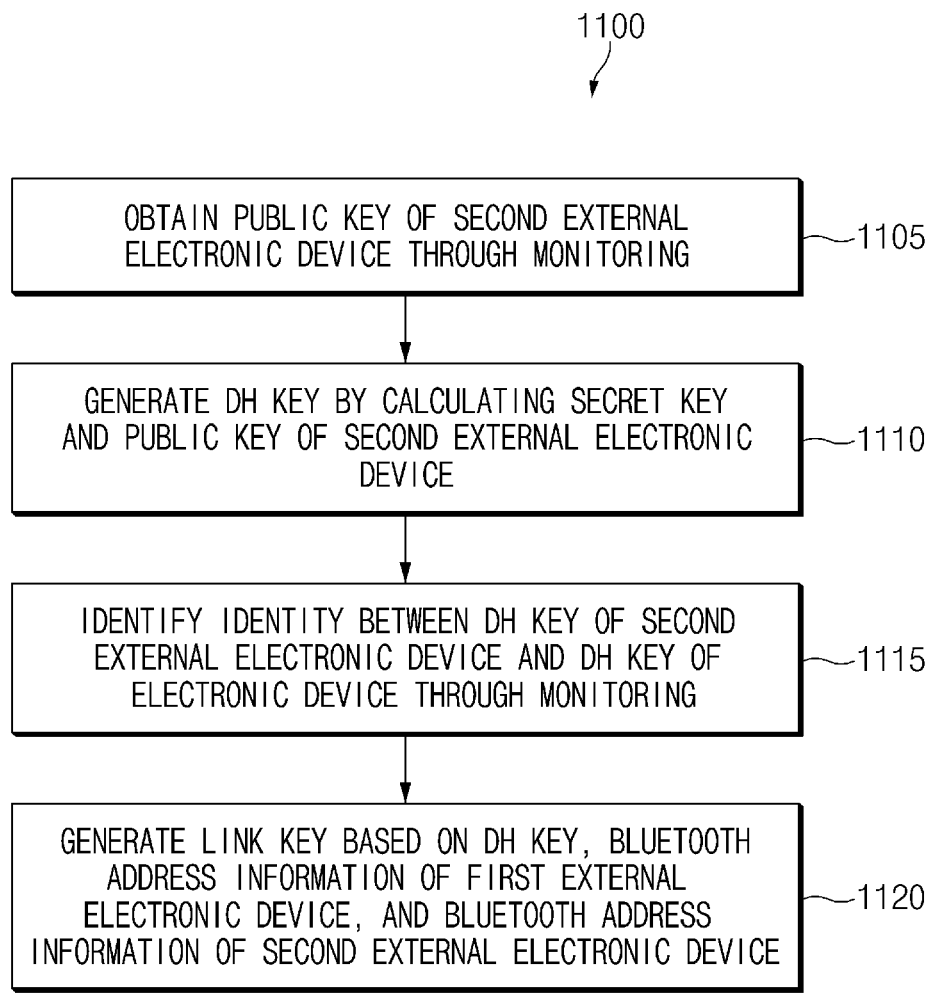
FIG. 11 illustrates an operational flowchart of an electronic device for generating a link key according to an embodiment of the disclosure.

FIG. 11 illustrates another operational flowchart 1100 of an electronic device (e.g., a second device 202-2 of FIG. 2) for generating a link key according to an embodiment of the disclosure. Operations shown in FIG. 11 may be an embodiment of operation 1020 of FIG. 10.

Referring to FIG. 11, in operation 1105, the electronic device may obtain a public key of a second external electronic device (e.g., a user device 201 of FIG. 2) through monitoring of a second link (e.g., a first link 205 of FIG. 1).

In operation 1110, the electronic device may generate a DH key by calculating a secret key of the electronic device and a public key of the second external electronic device. The secret key of the electronic device may be generated based on, for example, a secret key generation scheme synchronized between the electronic device and a first external electronic device (e.g., a first device 202-1 of FIG. 2).

In operation 1115, the electronic device may identify identity between a DH key of the second external electronic device and a DH key of the electronic device through monitoring of the second link. For example, the electronic device may obtain a check value of the DH key of the second external electronic device, which is transmitted to the first external electronic device by the second external electronic device, through monitoring of the second link, and may identify the identity by calculating the obtained check value and the DH key of the electronic device.

In operation 1120, the electronic device may generate the same link key as that of the first external electronic device based on the DH key of the electronic device, Bluetooth address information of the first external electronic device, and Bluetooth address information of the second external electronic device.

Figure 12:
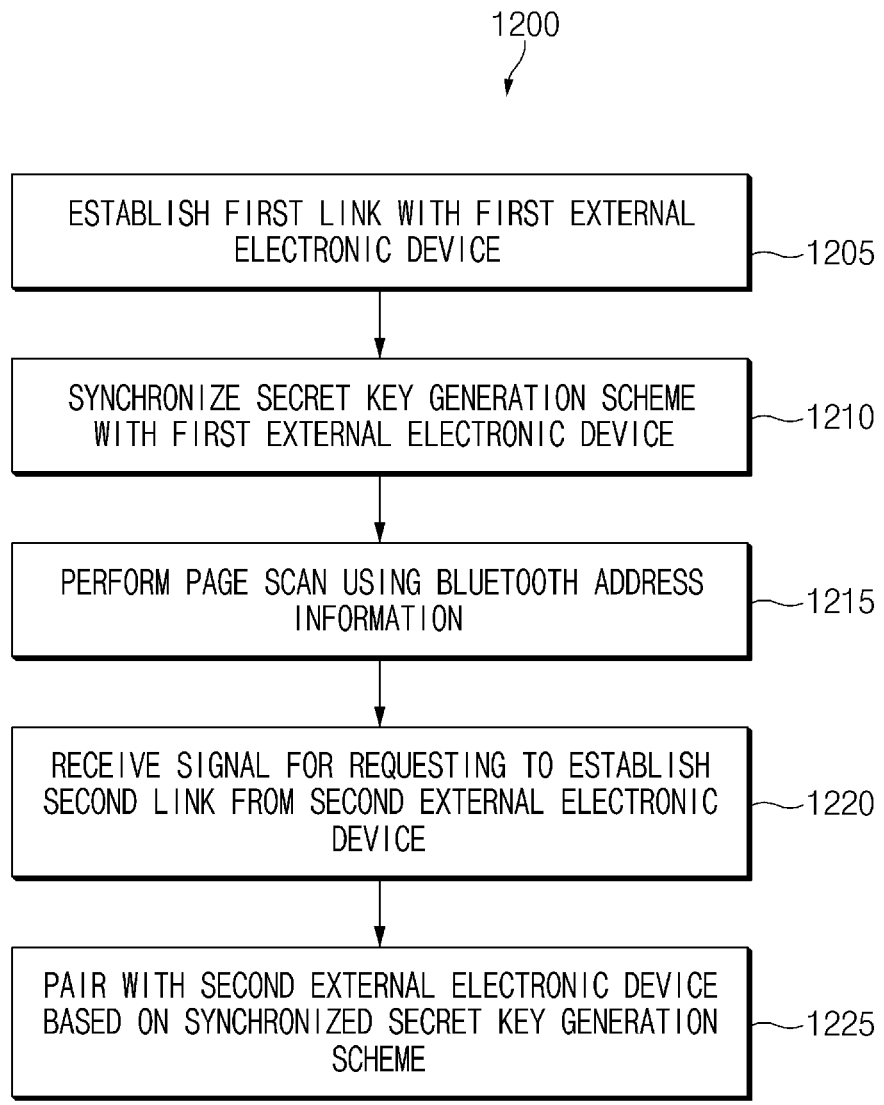
FIG. 12 illustrates an operational flowchart of an electronic device for sharing a secret key generation scheme according to an embodiment of the disclosure.

FIG. 12 illustrates an operational flowchart 1200 of an electronic device (e.g., a first device 202-1 of FIG. 2) for sharing a secret key generation scheme according to an embodiment of the disclosure.

Referring to FIG. 12, in operation 1205, the electronic device may establish a first link (e.g., a second link 210 of FIG. 2) based on a Bluetooth protocol with a first external electronic device (e.g., a second device 202-2 of FIG. 2).

In operation 1210, the electronic device may synchronize the secret key generation scheme with the first external electronic device. For example, the electronic device may synchronize the secret key generation scheme using at least one of an authentication key obtained while establishing the first link, an encryption key, master clock information at an initial connection time between the electronic device and the first external electronic device, or clock information at a time when a specific packet is received.

Although not illustrated in FIG. 12, the electronic device may synchronize a page scan parameter with the first external electronic device such that the first external electronic device may attempt to receive page information transmitted from a second external electronic device (e.g., a user device 201 of FIG. 2).

In operation 1215, the electronic device may perform a page scan using Bluetooth address information of the electronic device. For example, the electronic device may attempt to receive an ID packet or an FHS packet transmitted from the second external electronic device. In this case, the packet transmitted from the second external electronic device may include a DAC of the electronic device.

In operation 1220, the electronic device may receive a signal for requesting to establish a second link (e.g., a first link 205 of FIG. 2) from the second external electronic device.

In operation 1225, the electronic device may be paired with the second external electronic device for the second link based on the synchronized secret key generation scheme. For example, the electronic device may generate a secret key and a public key of the electronic device based on the synchronized secret key generation scheme. The electronic device may exchange the public key with the second external electronic device and may generate a link key by calculating the exchanged public key and the secret key. The generated link key may be used for an authentication procedure between the electronic device and the second external electronic device and may be used to encrypt and decrypt a data packet.

FIG. 12 illustrates an embodiment where the electronic device establishes the first link with the first external electronic device before establishing the second link with the second external electronic device. However, according to another embodiment, the electronic device may receive a signal for requesting to establish the second link from the second external electronic device before establishing the first link. In this case, the electronic device may guide a user to first establish the first link with the first external electronic device without establishing the second link. For example, the electronic device may guide the user to establish the first link through a user interface (e.g., at least one of a screen or a sound). In this case, the electronic device may further include an output device (e.g., a display device 160 or a sound output device 155 of FIG. 1) configured to output at least one of a screen or a sound. When the second link is established before the first link is established, the electronic device may release (or delete) the second link or may guide the user to perform a link supervision time (LSTO). When the second link is released, the electronic device may establish the first link with the first external electronic device and may synchronize a page scan parameter such that the first external electronic device may receive page information transmitted from the second external electronic device.

According to another embodiment, while (or after) the electronic device performs the procedure for establishing the second link with the second external electronic device, the first link between the electronic device and the first external electronic device may be released. In this case, as the first external electronic device may not know a frequency channel, because it is impossible for the first external electronic device to perform monitoring, the electronic device may guide the first external electronic device to perform the monitoring by changing adaptive frequency hopping (AFH) to all channels (e.g., 79) defined in Bluetooth standards. For example, when it is detected that the first link is released, the electronic device and the first external electronic device may reestablish the first link. When the first link is reestablished, the electronic device may change a master role of the second link to the electronic device. When playing a master role, the electronic device may change AFH to all channels.

As described above, an electronic device (e.g., a second device 202-2 of FIG. 4) according to various embodiments may include a wireless communication circuitry (e.g., at least a part of a wireless communication module 192 of FIG. 1) configured to support a Bluetooth protocol. The wireless communication circuitry may be configured to establish a first link (e.g., a second link 210 of FIG. 2) with a first external electronic device (e.g., a first device 202-1 of FIG. 2), synchronize a secret key generation scheme with the first external electronic device based on information obtained while establishing the first link, receive page information transmitted from a second external electronic device (e.g., a user device 201 of FIG. 4), based on Bluetooth address information of the first external electronic device, the Bluetooth address information being obtained while establishing the first link, generate a link key used for a second link (e.g., a first link 205 of FIG. 2) between the first external electronic device and the second external electronic device, based on the synchronized secret key generation scheme, and receive an encrypted data packet transmitted over the second link from the second external electronic device using the generated link key.

According to an embodiment, the information obtained while establishing the first link may include at least one of an authentication key, an encryption key, or clock information.

According to an embodiment, the clock information may include at least one of master clock information at an initial connection time between the electronic device and the first external electronic device or clock information at a time when an identification (ID) packet is received.

According to an embodiment, the wireless communication circuitry may be configured to attempt to receive the page information based on the Bluetooth address information and the clock information of the first external electronic device.

According to an embodiment, the wireless communication circuitry may be configured to synchronize a page scan parameter, the page scan parameter being used to receive the page information and including at least one of a starting channel (e.g., a first channel of FIG. 6), a starting timing (e.g., a starting timing 605 of FIG. 6), a page period (e.g., a specified page period 610 of FIG. 6), a page time (e.g., a specified page time 615 of FIG. 6), or a frequency hopping channel, with the first external electronic device, start a page scan at the same starting timing and on the same starting channel as the first external electronic device, based on the synchronized page scan parameter, and attempt to receive the page information while hopping to the same frequency channel as the first external electronic device during the same page period and the same page time as the first external electronic device, based on the synchronized page scan parameter.

According to an embodiment, the wireless communication circuitry may be configured to generate the same secret key as a secret key of the first external electronic device based on the synchronized secret key generation scheme, obtain a public key of the second external electronic device by monitoring a pairing procedure between the first external electronic device and the second external electronic device, and generate the link key using the generated secret key and the obtained public key.

According to an embodiment, the wireless communication circuitry may be configured to generate the same device access code (DAC) as a DAC of the first external electronic device, using Bluetooth address information of the first external electronic device, and attempt to receive page information including the DAC.

According to an embodiment, the wireless communication circuitry may be configured to detect that the first link is released, reestablish the first link with the first external electronic device, and attempt to receive the page information while hopping to all frequency channels defined by the Bluetooth protocol.

As described above, an electronic device (e.g., a first device 202-1 of FIG. 4) according to various embodiments may include a wireless communication circuitry (e.g., at least a part of a wireless communication module 192 of FIG. 1) configured to support a Bluetooth protocol. The wireless communication circuitry may be configured to establish a first link (e.g., a second link 210 of FIG. 2) with a first external electronic device (e.g., a second device 202-2 of FIG. 2), synchronize a secret key generation scheme with the first external electronic device based on information obtained while establishing the first link, perform a page scan based on Bluetooth address information of the electronic device, receive a signal for requesting to establish a second link (e.g., a first link 205 of FIG. 2) from a second external electronic device (e.g., a user device 201 of FIG. 4), and pair with the second external electronic device based on the synchronized secret key generation.

According to an embodiment, the information obtained while establishing the first link may include at least one of an authentication key, an encryption key, or clock information.

According to an embodiment, the clock information may include at least one of master clock information at an initial connection time between the electronic device and the first external electronic device or clock information at a time when an ID packet is received.

According to an embodiment, the wireless communication circuitry may be configured to synchronize a parameter for the page scan with the first external electronic device. The parameter may include at least one of a starting channel (e.g., a first channel of FIG. 6), a starting timing (e.g., a starting timing 605 of FIG. 6), a page period (e.g., a specified page period 610 of FIG. 6), a page time (e.g., a specified page time 615 of FIG. 6), or a frequency hopping channel.

According to an embodiment, the wireless communication circuitry may be configured to generate a secret key based on the synchronized secret key generation scheme, exchange a public key with the second external electronic device, and generate a link key used for the second link using the generated secret key and the exchanged public key.

According to an embodiment, the wireless communication circuitry may be configured to detect that the first link is released, reestablish the first link with the first external electronic device, change a master role of the second link to the electronic device, and change adaptive frequency hopping (AFH) of the second link to all frequency channels defined by the Bluetooth protocol.

According to an embodiment, the electronic device may further include an output device (e.g., a display device 160 or a sound output device 155 of FIG. 1) and a processor (e.g., a processor 120 of FIG. 1) operatively connected with the output device and the wireless communication circuitry. The processor may be configured to receive a signal for requesting to establish the second link from the second external electronic device before establishing the first link, via the wireless communication circuitry, and output a user interface for guiding a user to establish the first link, via the output device.

As described above, an electronic device (e.g., a second device 202-2 of FIG. 4) according to various embodiments may include a wireless communication circuitry (e.g., at least a part of a wireless communication module 192 of FIG. 1) configured to support a Bluetooth protocol and a memory (e.g., a memory 130 of FIG. 1), operatively connected with the wireless communication circuitry, for storing a secret key generation scheme synchronized between the electronic device and a first external electronic device (e.g., a first device 202-1 of FIG. 4). The wireless communication circuitry may be configured to establish a first link (e.g., a second link 210 of FIG. 2) with the first external electronic device, receive page information transmitted from a second external electronic device (e.g., a user device 201 of FIG. 4), based on Bluetooth address information of the first external electronic device, the Bluetooth address information being obtained while establishing the first link or being previously stored in the memory, generate a link key used for a second link between the first external electronic device and the second external electronic device, based on the stored secret key generation scheme, and receive an encrypted data packet transmitted over the second link from the second external electronic device using the generated link key.

According to an embodiment, the wireless communication circuitry may be configured to synchronize a page scan parameter, the page scan parameter being used to receive the page information and including at least one of a starting channel (e.g., a first channel of FIG. 6), a starting timing (e.g., a starting timing 605 of FIG. 6), a page period (e.g., a specified page period 610 of FIG. 6), a page time (e.g., a specified page time 615 of FIG. 6), or a frequency hopping channel, with the first external electronic device, start a page scan at the same starting timing and on the same starting channel as the first external electronic device, based on the synchronized page scan parameter, and attempt to receive the page information while hopping to the same frequency channel as the first external electronic device during the same page period and the same page time as the first external electronic device, based on the synchronized page scan parameter.

According to an embodiment, the wireless communication circuitry may be configured to generate the same secret key as a secret key of the first external electronic device based on the stored secret key generation scheme, obtain a public key of the second external electronic device by monitoring a pairing procedure between the first external electronic device and the second external electronic device, and generate the link key using the generated secret key and the obtained public key.

According to an embodiment, the wireless communication circuitry may be configured to generate the same device access code (DAC) as a DAC of the first external electronic device, using Bluetooth address information of the first external electronic device, and attempt to receive page information including the DAC.

According to an embodiment, the wireless communication circuitry may be configured to detect that the first link is released, reestablish the first link with the first external electronic device, and attempt to receive the page information while hopping to all frequency channels defined by the Bluetooth protocol.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments disclosed in the disclosure, the electronic device may reduce resources and current consumed in a Bluetooth network environment, thus reducing a delay time for data processing.

According to various embodiments disclosed in the disclosure, the electronic device may safely and efficiently receive a data packet transmitted over another link in the Bluetooth network environment.

In addition, various effects ascertained directly or indirectly through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a wireless communication circuitry configured to support a Bluetooth protocol,
wherein the wireless communication circuitry is configured to:
establish a first link with a first external electronic device,
synchronize a secret key generation scheme with the first external electronic device based on information obtained while establishing the first link,
receive page information transmitted from a second external electronic device, based on Bluetooth address information of the first external electronic device, the Bluetooth address information being obtained while establishing the first link,
generate a link key used for a second link between the first external electronic device and the second external electronic device, based on the synchronized secret key generation scheme, and
receive an encrypted data packet transmitted over the second link from the second external electronic device using the generated link key.

2. The electronic device of claim 1, wherein the information obtained while establishing the first link includes at least one of an authentication key, an encryption key, or clock information.

3. The electronic device of claim 2, wherein the clock information includes at least one of master clock information at an initial connection time between the electronic device and the first external electronic device or clock information at a time when an identification (ID) packet is received.

4. The electronic device of claim 1, wherein the wireless communication circuitry is further configured to receive the page information based on the Bluetooth address information and clock information of the first external electronic device.

5. The electronic device of claim 1, wherein the wireless communication circuitry is further configured to:
synchronize a page scan parameter, the page scan parameter being used to receive the page information and including at least one of a starting channel, a starting timing, a page period, a page time, or a frequency hopping channel, with the first external electronic device, start a page scan at the same starting timing and on the same starting channel as the first external electronic device, based on the synchronized page scan parameter, and receive the page information while hopping to the same frequency channel as the first external electronic device during the same page period and the same page time as the first external electronic device, based on the synchronized page scan parameter.

6. The electronic device of claim 1, wherein the wireless communication circuitry is further configured to:

generate a secret key that is the same as a secret key of the first external electronic device based on the synchronized secret key generation scheme, obtain a public key of the second external electronic device by monitoring a pairing procedure between the first external electronic device and the second external electronic device, and generate the link key using the generated secret key and the obtained public key.

7. The electronic device of claim 1, wherein the wireless communication circuitry is further configured to:

generate the same device access code (DAC) as a DAC of the first external electronic device, using the Bluetooth address information of the first external electronic device, and receive the page information including the DAC.

8. The electronic device of claim 1, wherein the wireless communication circuitry is further configured to:

detect that the first link is released, reestablish the first link with the first external electronic device, and receive the page information while hopping to all frequency channels defined by the Bluetooth protocol.

9. An electronic device, comprising:

a wireless communication circuitry configured to support a Bluetooth protocol, wherein the wireless communication circuitry is configured to:

establish a first link with a first external electronic device, synchronize a secret key generation scheme with the first external electronic device based on information obtained while establishing the first link, perform a page scan based on Bluetooth address information of the electronic device, receive a signal for requesting to establish a second link from a second external electronic device, and pair with the second external electronic device based on the synchronized secret key generation scheme.

10. The electronic device of claim 9, wherein the information obtained while establishing the first link includes at least one of an authentication key, an encryption key, or clock information.

11. The electronic device of claim 10, wherein the clock information includes at least one of master clock information at an initial connection time between the electronic device and the first external electronic device or clock information at a time when an ID packet is received.

12. The electronic device of claim 9, wherein the wireless communication circuitry is further configured to synchronize a parameter for the page scan with the first external electronic device, and wherein the parameter includes at least one of a starting channel, a starting timing, a page period, a page time, or a frequency hopping channel.

13. The electronic device of claim 9, wherein the wireless communication circuitry is further configured to:

generate a secret key based on the synchronized secret key generation scheme, exchange a public key with the second external electronic device, and generate a link key used for the second link using the generated secret key and the exchanged public key.

14. The electronic device of claim 9, wherein the wireless communication circuitry is further configured to:

detect that the first link is released, reestablish the first link with the first external electronic device, change a master role of the second link to the electronic device, and change adaptive frequency hopping (AFH) of the second link to all frequency channels defined by the Bluetooth protocol.

15. The electronic device of claim 9, further comprising:

an output device; and at least one processor operatively connected with the output device and the wireless communication circuitry, wherein the at least one processor is configured to:

receive the signal for requesting to establish the second link from the second external electronic device before establishing the first link, via the wireless communication circuitry, and output a user interface for guiding a user to establish the first link, via the output device.

16. An electronic device, comprising:

a wireless communication circuitry configured to support a Bluetooth protocol; and a memory, operatively connected with the wireless communication circuitry, for storing a secret key generation scheme synchronized between the electronic device and a first external electronic device, wherein the wireless communication circuitry is configured to:

establish a first link with the first external electronic device, receive page information transmitted from a second external electronic device, based on Bluetooth address information of the first external electronic device, the Bluetooth address information being obtained while establishing the first link or being previously stored in the memory, generate a link key used for a second link between the first external electronic device and the second external electronic device, based on the stored secret key generation scheme, and receive an encrypted data packet transmitted over the second link from the second external electronic device using the generated link key.

17. The electronic device of claim 16, wherein the wireless communication circuitry is further configured to:

synchronize a page scan parameter, the page scan parameter being used to receive the page information and including at least one of a starting channel, a starting timing, a page period, a page time, or a frequency hopping channel, with the first external electronic device, start a page scan at the same starting timing and on the same starting channel as the first external electronic device, based on the synchronized page scan parameter, and receive the page information while hopping to the same frequency channel as the first external electronic device during the same page period and the same page time as the first external electronic device, based on the synchronized page scan parameter.

18. The electronic device of claim 16, wherein the wireless communication circuitry is further configured to:
   generate a secret key that is the same as a secret key of the first external electronic device based on the stored secret key generation scheme,
   obtain a public key of the second external electronic device by monitoring a pairing procedure between the first external electronic device and the second external electronic device, and
   generate the link key using the generated secret key and the obtained public key.

19. The electronic device of claim 16, wherein the wireless communication circuitry is further configured to:
   generate the same device access code (DAC) as a DAC of the first external electronic device, using the Bluetooth address information of the first external electronic device, and
   receive the page information including the DAC.

20. The electronic device of claim 16, wherein the wireless communication circuitry is further configured to:
   detect that the first link is released,
   reestablish the first link with the first external electronic device, and
   receive the page information while hopping to all frequency channels defined by the Bluetooth protocol.

* * * * *